Figure 1:
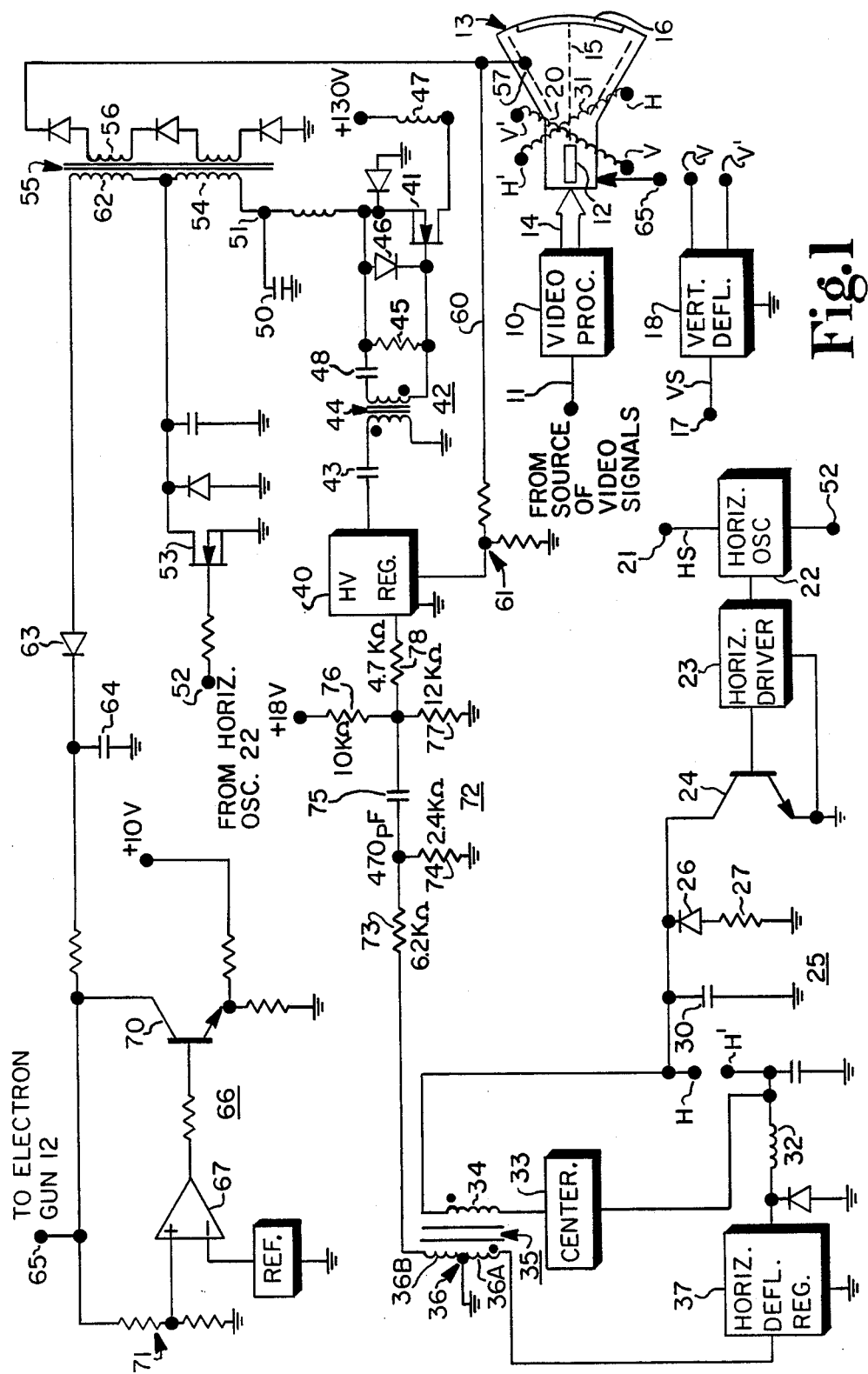
Figure 2:
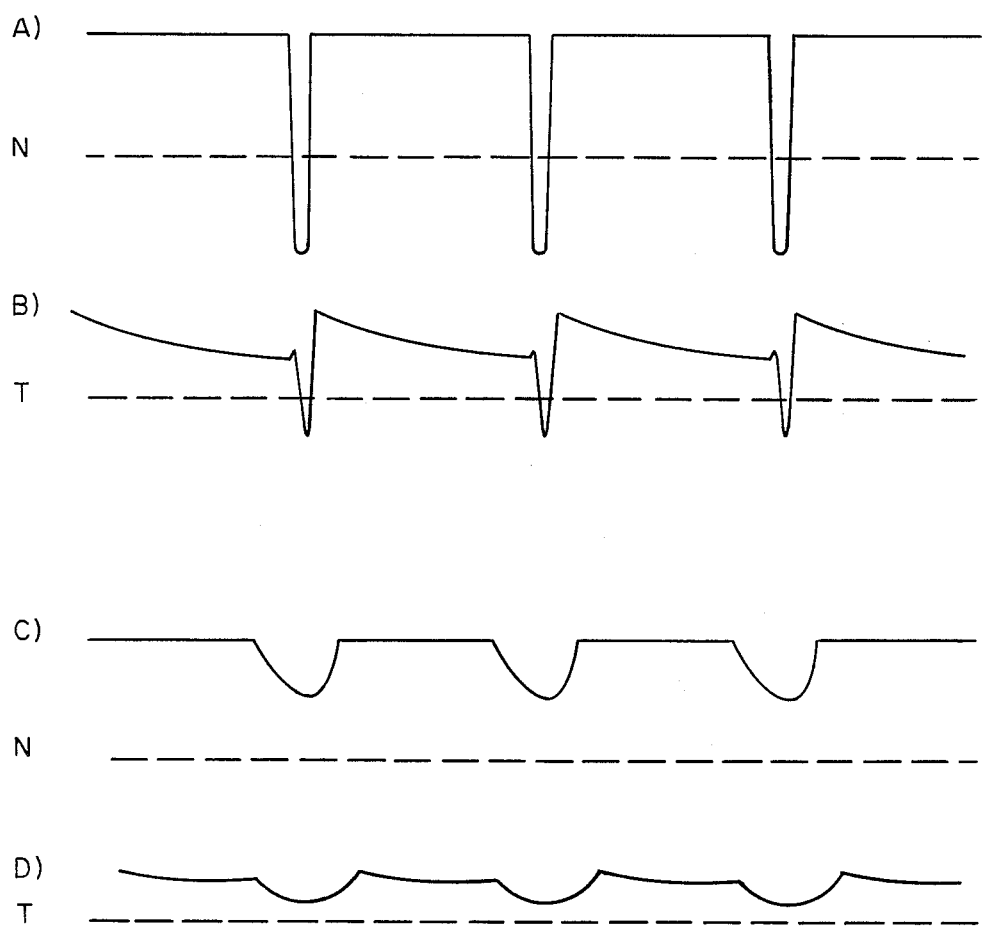

United States Patent [19]

Dietz

[11] Patent Number: 4,737,694

[45] Date of Patent: Apr. 12, 1988

[54] VIDEO APPARATUS DEFLECTION LOSS PROTECTION

[75] Inventor: Wolfgang F. W. Dietz, New Hope, Pa.

[73] Assignee: RCA Corporation, Princeton, N.J.

[21] Appl. No.: 926,701

[22] Filed: Nov. 4, 1986

[51] Int. Cl.$^4$ .................. H01J 29/70; H04N 5/63; H04N 5/68

[52] U.S. Cl. .................. 315/411; 358/190; 358/243

[58] Field of Search ............... 315/411; 358/190, 243, 358/242

[56] References Cited

U.S. PATENT DOCUMENTS 4,047,078 9/1977 Meehan .................. 315/411

Primary Examiner—Theodore M. Blum
Assistant Examiner—Gregory C. Issing
Attorney, Agent, or Firm—Paul J. Rasmussen; Joseph J. Laks; Scott J. Stevens

[57] ABSTRACT

In a video display apparatus, the high voltage generating circuitry responds to trigger pulses derived from horizontal deflection retrace-related pulses. During normal horizontal deflection operation, the trigger pulses produced are of sufficient amplitude to cause normal triggering of the high voltage generating circuits resulting in normal high voltage levels being produced. Under abnormal horizontal deflection operation in which the horizontal deflection current is not produced, the trigger pulses will be of insufficient amplitude to trigger the high voltage generating circuit, and hence no high voltage level is produced.

3 Claims, 2 Drawing Sheets

VIDEO APPARATUS DEFLECTION LOSS PROTECTION

This invention relates to video display apparatus and, in particular, to deflection loss protection circuits for cathode ray tubes.

A video display apparatus, such as a television receiver or a computer monitor, incorporates a cathode ray tube (CRT) that produces one or more electron beams. The beams are made to impinge upon and illuminate a phosphor display screen of the CRT by action of a high voltage beam accelerating potential. The electron beam or beams are repeatedly deflected or scanned in horizontal and vertical directions at a given rate or frequency to form a raster on the CRT display screen. The electron beam intensity is modulated in accordance with video signal information to produce a picture on the display screen.

The display screen phosphor coating is susceptible to damage from the impingement of an unscanned electron beam which can occur, for example, due to loss of a deflection signal or failure of the deflection windings of the deflection yoke. In a conventional flyback-type power supply and deflection circuit, horizontal deflection rate retrace or flyback pulses are used to produce the high voltage level via a high voltage transformer. Loss of horizontal deflection, therefore, results in the loss of high voltage or beam accelerating potential, so that damage to the CRT is avoided.

In some applications, such as computer monitors where accurate voltage regulation is critical, it is desirable to generate the high voltage level separate from the horizontal deflection circuit. In a circuit of this type, loss of horizontal deflection may not result in the loss of high voltage, so that damage to the phosphor display screen may occur. It is therefore desirable to provide some form of protection circuitry that disables the high voltage generator if deflection loss should occur.

In accordance with an aspect of the present invention, a video display apparatus comprises a high voltage generator incorporating circuitry responsive to a trigger signal above a predetermined amplitude for causing a high voltage signal to be produced. The circuitry is substantially nonresponsive to a trigger signal below the predetermined amplitude such that the high voltage signal is not produced. A deflection circuit produces a deflection rate signal that has an amplitude above a first level when the deflection circuit operates normally and an amplitude below the first level when the deflection circuit operates abnormally. Circuitry responds to the deflection rate signal and generates the trigger signal for the high voltage generator. The trigger signal has an amplitude above the predetermined level when the amplitude of the deflection rate signal is above the first level so that a high voltage signal is produced during normal operation of the deflection circuit. The trigger signal has an amplitude below the predetermined level when the amplitude of the deflection rate signal is below the first level so that a high voltage signal is not produced during abnormal operation of the deflection circuit.

In the accompanying drawing,

FIG. 1 is a block and schematic diagram of a portion of a video display apparatus in accordance with an aspect of the present invention; and FIGS. 2a-d illustrates waveforms useful in understanding the operation of the circuit shown in FIG. 1.

Referring to FIG. 1, there is shown a portion of a video display apparatus, such as a computer monitor or a television receiver, in which video signals from a source of video signals (not shown) are applied to video processing circuitry 10 via a conductor 11. The video signals may be provided, for example, by tuning circuitry incorporated as part of the video display apparatus or by external means, such as a computer or a video cassette recorder. Video processing circuitry 10 produces drive signals that are applied to the electron gun assembly 12 of a cathode ray tube (CRT) 13 via a conductor 14. Electron gun assembly 12 generates one or more electron beams 15 that are caused to impinge upon and illuminate a phosphor display screen 16 located on the front panel of CRT 13. The intensity of the electron beams is controlled in accordance with the picture information of the video signals.

The source of video signals may also provide line and field rate synchronizing information, for example, as part of a composite video signal, which is then separated from the video information, or as separate synchronizing signals. The vertical or field rate synchronizing signals are accordingly applied from a terminal 17 to a vertical deflection circuit 18 via a conductor designated VS. Vertical deflection circuit 17, via terminals V and V', generates vertical rate deflection current in a deflection winding 20, located on the neck of CRT 13, that in turn produces a vertical deflection field for deflecting or scanning the electron beam 15 at a field rate across display screen 16. Horizontal or line rate synchronizing signals are applied from a terminal 21 to horizontal oscillator circuitry 22 via a conductor designated HS. The horizontal rate output signal from horizontal oscillator 22 is applied to horizontal driver circuit 23 which produces horizontal rate switching signals for a horizontal output device, shown as transistor 24. Transistor 24 forms part of a resonant retrace-type output circuit 25 that also includes damper diode 26, resistor 27 and retrace capacitor 30. Output circuit 25 generates, via terminals H and H', horizontal rate deflection current in horizontal deflection winding 31, also located on the neck of CRT 13, that produces a horizontal deflection field for deflecting electron beam 15 at a line rate across display screen 16. Deflection current flow through deflection winding 31 and linearity coil 32 is controlled by centering circuit 33 in accordance with a factory set-up adjustment in order to achieve horizontal centering of the scanned video information on display screen 16.

The horizontal deflection voltage is applied across primary winding 34 of a transformer 35, thereby inducing a voltage across a secondary winding 36, which is illustratively shown as comprising a tapped winding. The voltage developed across the portion of winding 36 designated 36A is applied to a horizontal deflection regulator circuit 37. Deflection regulator circuit 37 acts to control the horizontal deflection current amplitude by controlling the effective B+ supply voltage to the deflection circuit in accordance with the sensing voltage developed across winding 36A.

In accordance with an aspect of the present invention, the voltage developed across winding 36B is utilized to provide input or trigger pulses to high voltage regulator circuit 40. Both high voltage regulator circuit 40 and horizontal deflection regulator circuit 37 may illustratively incorporate an integrated circuit such as that designated CA555 manufactured by RCA Corporation. The width modulated output pulse signal of high voltage regulator circuit 40 is applied to the gate of a field effect transistor (FET) 41 by a drive circuit 42. Drive circuit 42 comprises capacitor 43, transformer 44, capacitor 48, resistor 45 and FET input voltage limiting zener diode 46. The drain of FET 41 is coupled to a source of potential, illustratively of the order of +130 volts DC, via inductor 47. Switching of FET 41 by the output signal from high voltage regulator circuit 40 effectively chops the +130 volts input voltage level such that a voltage level is established across capacitor 50, and present at terminal 51. The level of the voltage established at terminal 51 is determined as follows. An output signal at a terminal 52 from horizontal oscillator 22 is applied to the gate of a field effect transistor 53, causing FET 53 to switch between conductive and nonconductive states. The switching signal from horizontal oscillator 22 is a constant duty cycle single frequency pulse train, having a pulse frequency illustratively of the order of 64 kHz. Conduction of FET 53 causes current to flow in primary winding 54 of a high voltage transformer 55 from the source of potential established at terminal 51, thereby developing a high voltage level across tertiary or high voltage winding 56, which is applied to the high voltage or ultor terminal 57 of CRT 13. Feedback of the high voltage level to high voltage regulator 40 is accomplished via conductor 60 and voltage divider 61. Since FET 53 is switched at a constant rate and duty cycle, regulation of the high voltage level occurs by controlling the voltage level at terminal 51 as a result of controlling the switching of FET 41.

The voltage developed across winding 62 of transformer 55 is rectified and filtered by diode 63 and capacitor 64, respectively, to produce a DC voltage that is illustratively applied, via terminal 65, to the screen grid of electron gun assembly 12 of CRT 13. The level of screen grid voltage is regulated by regulator circuit 66 comprising in part comparator 67 and transistor 70. A voltage indicative of the screen grid voltage level is applied to the noninverting input of comparator 67 via a voltage divider 71. A reference voltage is applied to the noninverting input of comparator 67. When the level of the voltage indicative of the screen grid voltage level exceeds the reference voltage level, comparator 67 produces an output signal that causes transistor 70 to conduct, thereby discharging capacitor 64 and reducing the screen grid voltage level.

As previously described, the high voltage level is produced as a result of switching of FET 41 caused by the pulse width modulated output signal from high voltage generator 40. The output signal of high voltage generator 40 is produced in response to trigger pulses derived from the voltage across winding 36B. Failure of the horizontal deflection circuitry will therefore result in a loss of current flow through winding 34, such that no voltage is developed across winding 36B. Consequently, no trigger pulses are produced for high voltage regulator circuit 40 and the high voltage generating circuitry is desirably disabled. Under certain fault conditions, however, such as when horizontal deflection winding 31 becomes disconnected, for example, the horizontal deflection circuitry, including horizontal deflection output circuit 25, may continue to operate. Sufficient current may flow through winding 34 even in the absence of deflection winding 31 to enable the production of a pulse from winding 36B that has sufficient amplitude to cause triggering of high voltage regulator 40. In accordance with an aspect of the present invention, a pulse processing circuit 72 responds to the voltage pulses produced across winding 36B in a manner that causes high voltage regulator circuit 40 to be triggered during normal horizontal deflection operation and does not allow regulator circuit 40 to be triggered during abnormal operation of the horizontal deflection circuitry. Pulse processing circuit 72 comprises resistors 73 and 74, capacitor 75, and resistors 76, 77 and 80. The operation of pulse processing circuit will be described with reference to FIG. 2.

The operation of pulse processing circuit 72 causes applied pulses to be differentiated and attenuated so that pulses produced during normal deflection circuit operation result in trigger pulses of sufficient amplitude to cause triggering of high voltage regulator circuit 40 while pulses that may be produced during abnormal deflection circuit operation result in pulses that do not have sufficient amplitude to cause triggering of high voltage deregulator circuit 40. During normal deflection circuit operation, the pulses developed across winding 36B appear as shown in FIG. 2A. These horizontal rate pulses will exceed a level designated N during normal deflection circuit operation. After being differentiated and attenuated by pulse processing circuitry 72, the trigger pulses applied to high voltage regulator circuit 40 appear as shown in FIG. 2B. The trigger threshold level T of high voltage regulator circuit 40 is also shown in FIG. 2B. As can be seen, the trigger pulses applied to high voltage regulator circuit 40 during normal operation of the horizontal deflection circuit exceed the trigger threshold T, resulting in normal triggering of the high voltage generator circuit 40.

During an abnormal condition in which the horizontal deflection current is not produced, yet the horizontal deflection output circuit 25 continues to operate, such as when the deflection winding 31 becomes disconnected, the pulses developed across winding 36B may appear as shown in FIG. 2C. As can be seen, the pulses shown do not exceed the level N. Differentiation and attenuation by pulse processing circuitry 72 results in pulses that appear as shown in FIG. 2D. As can be seen, the pulses of FIG. 2D do not exceed the trigger threshold T and are therefore of insufficient amplitude to cause triggering of high voltage regulator circuit 40. Consequently, no high voltage is produced.

What is claimed is:

1. A video display apparatus comprising:

high voltage generating means incorporating means responsive to a trigger signal having an amplitude above a predetermined level for causing a high voltage signal to be produced, said means substantially nonresponsive to a trigger signal having an amplitude below said predetermined level such that said high voltage signal is not produced;

deflection circuit means producing a deflection rate signal having an amplitude above a first level during normal operation of said deflection circuit means and having an amplitude below said first level during abnormal operation of said deflection circuit means; and means responsive to said deflection rate signal for generating said trigger signal, said trigger signal having an amplitude above said predetermined level when the amplitude of said deflection rate signal is above said first level, said trigger signal having an amplitude below said predetermined level when the amplitude of said deflection rate signal is below said first level, such that said high voltage signal is produced during normal operation of said deflection circuit means and is not produced during abnormal operation of said deflection circuit means.

2. The arrangement defined in claim 1, wherein said means for generating said trigger pulses comprises means for differentiating said deflection rate signal.

3. The arrangement defined in claim 2, wherein said means for generating said trigger pulses comprises means for attenuating said deflection rate signal.

* * * * *